United States Patent [19]
Nute, Jr. et al.

[11] 3,921,365
[45] Nov. 25, 1975

[54] JOINT STRUCTURE FOR SUSPENDED CEILING SYSTEM MEMBER

[75] Inventors: Ernest B. Nute, Jr., Mountville; Paul H. Jones, Willow Grove; Frank J. Vasaturo, Holmes, all of Pa.

[73] Assignee: Armstrong Cork Company, Lancaster, Pa.

[22] Filed: Oct. 4, 1974

[21] Appl. No.: 512,168

[52] U.S. Cl. .............................. 52/758 A; 403/393
[51] Int. Cl.² ............................................ F16B 7/04
[58] Field of Search .......... 52/758 A; 403/393, 347, 403/382, 403, 364, 217

[56] References Cited
UNITED STATES PATENTS

| | | |
|---|---|---|
| 3,142,367 | 7/1964 | Brown et al. ................. 52/758 A X |
| 3,284,977 | 11/1966 | Lickliter et al. .............. 52/758 A X |
| 3,789,566 | 2/1974 | Boylan .................................. 52/573 |

*Primary Examiner*—Werner H. Schroeder
*Assistant Examiner*—Wayne L. Shedd

[57] ABSTRACT

A cross member is provided with a flange which is placed in the edge kerf of ceiling boards. The cross member supports the ceiling boards in position. A joint structure is provided to connect together two adjacent cross members. The joint structure is so arranged with a slot and a protrusion that the two cross members can be somewhat adjustable in length and have a positive engagement between the slot and the protrusion.

3 Claims, 2 Drawing Figures

JOINT STRUCTURE FOR SUSPENDED CEILING SYSTEM MEMBER

BACKGROUND OF THE INVENTION

1. Field of the Invention

The invention is directed to a suspended ceiling system and, more particularly, to a joint structure for cross members of the suspended ceiling system.

2. Description of the Prior Art

U.S. Pat. Nos. 2,710,679 and 3,374,596 are two typical examples of suspended ceiling systems and the joint structures used to fasten together the ceiling suspension members. The first-mentioned patent uses a plate structure 16 to function as a splice clip to hold adjacent support members together. The second-mentioned patent has the ends of the support members so formed that they can lock together. Neither of these two structures are capable of adjustment.

In U.S. Pat. No. 2,499,278 there is shown a suspended ceiling system of the type wherein the joint structure herein could be used with the runner 70 therein being used to carry the ceiling units by having the ceiling units carried on the flanges on the runner. The joint structure herein is particularly useful for fastening together two adjacent support members similar to runners 70 of the above patent.

U.S. Pat. No. 3,789,566 shows a joint structure for a suspended ceiling system wherein a slot and tab are used to connect together the ends of two cross members. The invention herein is an improvement over the structure of that patent. The structure herein provides for a positive engagement between the protrusion and slot structure of the invention herein whereas in the structure of the aforesaid patent there is no positive engagement between the slot and tab such as to prevent an easy separation of the two ends of the cross members.

SUMMARY OF THE INVENTION

The primary inventive feature herein is the end detail for a cross member of a suspended ceiling system. Each of two adjacent ends of the cross members has a slot or opening in the extension from the vertical web of the cross members. In addition, each extension has protrusions extending to either side of the extension. Two adjacent cross members are placed end-to-end with the extensions being placed side-by-side. When this is done, one of the protrusions of the one cross member extends into the slot of the adjacent cross member and vice versa relative to the other slot and protrusion construction so as to positively hold the two cross members together. Whenever a force is moved in a direction perpendicular to the plane of the flanges of the cross members, there will be no movement of the two cross members at the joint structure. Likewise, when there is a movement of the two cross members in a direction perpendicular to the plane of the extension, the two cross members will be held together by the interlocking relationship between the protrusion and the slots. When there is movement of the two cross members along their longitudinal axis, the two extensions will not be separated, but the cross members will be somewhat longitudinally adjustable. Ceiling panels on either side of the joint structures will further tend to hold the joint structures together in an assembled ceiling.

The joint structure herein is particularly useful for the ordinary home owner who is putting up his own ceiling system. Herein is a joint structure which can be readily fastened together and will allow the home owner a certain degree of adjustability so that he need not place the ceiling system together with the high degree of accuracy which is normally required with conventional ceiling suspension support structures.

DESCRIPTION OF THE PREFERRED EMBODIMENT

In a normal ceiling suspension system, the cross member 1 is the element that supports the ceiling panel 16 if it is the type of panel which has a kerf in its edge to receive the flange of the cross member. This provides a concealed ceiling suspension grid system. The cross members are usually supported from main runner members. The main runner members are supported by wires or nails from the structural ceiling of a room.

Figure 1:
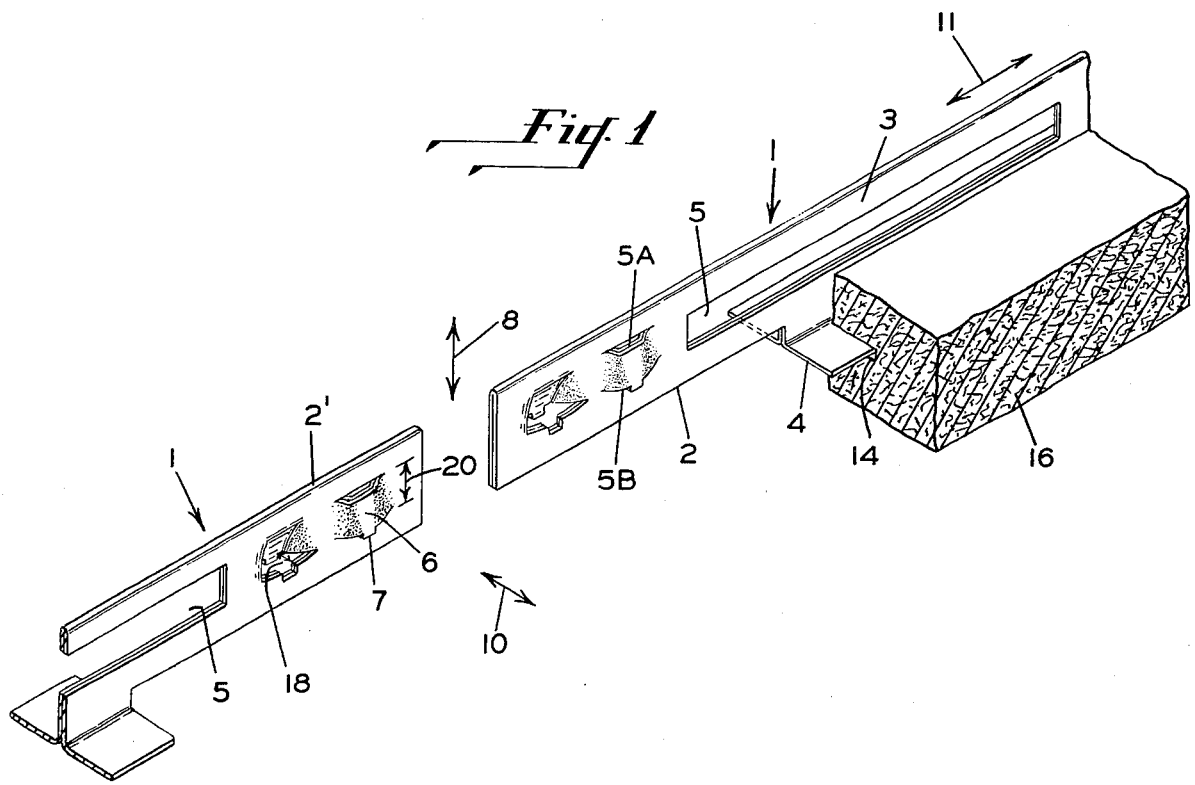
FIG. 1 is an exploded isometric view of the invention herein.
Figure 2:
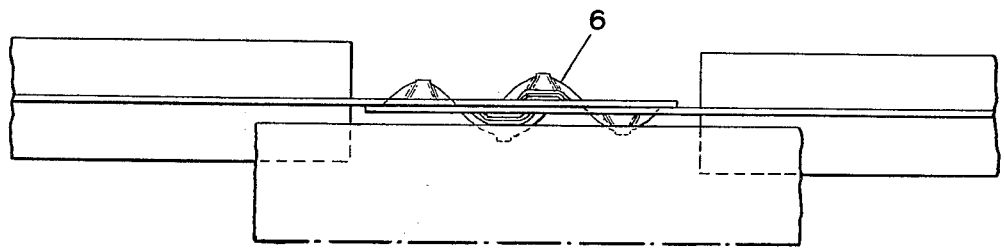
FIG. 2 is a top view of the assembled joint structure.

Referring to FIG. 1, the two adjacent cross members 1 are identical. Each of the members has an extension 2, 2' which extends out beyond the main body portion of the cross member. The main body portion of the cross member is composed of a vertical rib 3 and a horizontal flange structure 4 which extends out on either side of the vertical rib 3. The extension 2 of the cross member has the joint structure which is used to fasten together the two adjacent cross members. Each of the extensions 2, 2' has a slot or opening 5 and two offset protrusions 6. On each extension, the protrusion extends to either side of the extension portion of the cross member. The protrusion 6 is formed by pressing material out from the body of the extension. A ledge 5A is formed at the top of the protrusion where the metal of the protrusion extends slightly beyond the plane of the extension. The lower side 5B of the protrusion extends even further from the plane of the extension. The distance between these elements 5A and 5B is about equal to the width of opening 5 (see distance indicated by line 20). The material pushed out is stretched slightly to form the generally bowed configuration for the protrusion. This bowed configuration for the protrusion 6 can be best seen in FIG. 2 which is a top view of the assembled joint structure. At the bottom of the protrusion 6, where it is bowed out the greatest distance from the main body of the extension, there is placed a dimple 7. This dimple 7 is displaced from the main body of the extension by a distance which is slightly greater than the thickness of the extension member (see distance indicated by line 18).

When two adjacent cross member extensions are placed side-by-side, one of the protrusions 6 in the one cross member slides into the slot 5 of the adjacent cross member. In turn, one of the protrusions 6 of the adjacent cross member slides into slot 5 of the other cross member. The positioning of the protrusion in the slot of each cross member provides a structure which can resist an up-and-down direction (and particularly a downward) movement in the direction of the arrow 8 in the plane of the extension members. Thus, a force supplied in the direction of the arrow 8 will not move one extension member 2 relative to the other extension member 2'.

Since the main body of one extension member is on one side of the second extension member and the dimple 7 of the protrusion 6 of the one cross member extension is on the other side of the second cross member extension, the two cross member extensions are locked together so that a force moved in the direction of the arrow 10 will not readily cause separation of the two cross members. In affect, the extension of one cross member is grasp between the dimple 7 of the protrusion 6 and the main body of the other cross member extension. The engagement between the two cross member extensions is not an engagement that can take a substantial pressure in the direction of the arrow 10. However, it is such that a moderate force in the direction of the arrow 10 will still result in the two cross members being held together. This will materially assist the home owner when he is attempting to assemble the suspended ceiling system in his home.

Normally the horizontal flanges 4 of the cross members are inserted in grooves or kerfs 14 cut into ceiling panel 16. The ceiling panels are supported on the flanges 4. Since there will be ceiling panels on either side of the cross member, the presence of the ceiling panels on either side of the joint will further contribute to the prevention of separation of the cross member extensions in the direction 10. This will be particularly true when the complete ceiling structure is up and the ceiling panels extend from one wall to the opposite wall. There will then be no give in the ceiling structure to permit one to pry two ceiling panels sufficiently far apart to permit separation of the two extension members.

A particularly good feature of the protrusion and slot structure above described is that it will permit an adjustment or expansion of at least two cross members. That is, the cross members will be permitted limited movement along the axis of the cross members, along the direction of the arrow 11, to permit a relative adjustment of the two adjacent cross members. For example, the cross members are generally sold in approximately 4-foot lengths. If two were installed in the ceiling system in a room which had a little less than 8 feet between two adjacent walls, the adjustability feature afforded by the protrusions and slots would permit one to extend the cross member system out until it approximately fills the distance between the two adjacent walls. Also, the adjustability feature eliminates the need for very accurate placement of the main runners. Alternately, if the home owner would make an error when he is cutting one of the cross members to a certain size, there would be permitted a little adjustability to compensate for a small error. In addition, the system is very easy to assemble together, there being no need to lock together different tab structures or plates. Once the ceiling system is installed, it is possible that there can be a little give in the cross members in a direction along the axis of the cross members so that the cross members can slide relative to each other. This feature is of some value, should there be a fire and there be a generation of sufficient heat to cause expansion of the cross members. If no expansion of the cross members were permitted, the cross members would tend to buckle and drop the ceiling tiles out of position.

The invention herein is an improvement over that of U.S. Pat. No. 3,789,566 in that a positive engagement is provided between the two cross members in the direction of the arrow 10 due to the presence of the protrusion 6 with the dimple 7.

What is claimed is:

1. In a suspended ceiling system including a plurality of members which are utilized to suspend ceiling panels in position, comprising: at least two cross members placed in an end-to-end relationship, each of said cross members having an extension projecting outwardly from the cross member, the main body of the cross member being composed of a vertical rib and a horizontal flange and the extension extends outwardly from the vertical rib, each extension on each cross member having a uniform width elongated slot structure therein and two bent-out protrusions extending on opposite sides of the plane of the extension, said two extension members being placed in a side-by-side relationship, and when the two extension members are in a side-by-side relationship, at least one protrusion of one extension member being inserted into the slot of the adjacent extension member whereby the cross member structures are capable of adjustment along the longitudinal axis of the cross members and will be able to restrain separation against a force applied either in the direction in a line perpendicular to the horizontal flange or in the plane of the extension members, ceiling panel structures are positioned on the horizontal flange and are located on either side of the two mating extension members of two adjacent cross members, the improvement comprising a dimple being positioned on only one side of the protrusion and spaced from the plane of the extension a distance equal to approximately the thickness of the extension, said dimple projecting below the bottom surface of the protrusion and engages the edge of the slot of the adjacent extension to positively lock together the extension member containing the protrusion and the extension member containing the slot.

2. The system of claim 1 wherein the protrusion extends beyond the plane of the extension member both at its top and at its base, the point of maximum projection from the plane of the extension member being at its base, and the width of the protrusion being equal to approximately the width of the slot structure of the extension, said dimple extending beyond this width distance whereby the total width of the protrusion and dimple is greater than the width of the slot of the extension.

3. The system of claim 2 wherein the elongated slot structure extends along the extension member and is sufficiently long to provide adjustment of the length of two adjacent cross members.

* * * * *